United States Patent
Vaarkamp et al.

(10) Patent No.: US 6,296,759 B1
(45) Date of Patent: Oct. 2, 2001

(54) PROCESS FOR HYDROGENATION, HYDROISOMERIZATION AND/OR HYDRODESULFURIZATION OF A SULFUR CONTAINMENT CONTAINING FEEDSTOCK

(75) Inventors: Marinus Vaarkamp, Utrecht; Bernard Hendrik Reesink, Doorn; Pieter Hildegardus Berben, Maarn, all of (NL)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/367,095
(22) PCT Filed: Feb. 12, 1996
(86) PCT No.: PCT/NL98/00090
§ 371 Date: Nov. 5, 1999
§ 102(e) Date: Nov. 5, 1999
(87) PCT Pub. No.: WO98/35754
PCT Pub. Date: Aug. 20, 1998

(30) Foreign Application Priority Data

Feb. 13, 1997 (EP) .................................................. 97200410

(51) Int. Cl.⁷ .................................................. C10G 49/06
(52) U.S. Cl. ........................... 208/217; 208/143; 585/269
(58) Field of Search ............................. 208/46, 138, 143, 208/217, 28; 585/269

(56) References Cited

U.S. PATENT DOCUMENTS

| | | | |
|---|---|---|---|
| 3,943,053 | * | 3/1976 | Kovach et al. ........................ 208/143 |
| 4,049,576 | * | 9/1977 | Kovach et al. ........................ 252/441 |
| 4,197,187 | * | 4/1980 | Day et al. ............................. 208/138 |
| 5,049,536 | * | 9/1991 | Bellussi et al. ....................... 502/235 |
| 5,767,038 | * | 6/1998 | Perego et al. ........................ 502/235 |

FOREIGN PATENT DOCUMENTS

| | | | |
|---|---|---|---|
| 090 994 A2 | * | 2/1958 | (EP) . |
| 582 347 A1 | * | 9/1994 | (EP) . |
| 718 239A1 | * | 6/1996 | (EP) . |
| 1 501 346 | * | 2/1958 | (GB) . |
| 790476 | * | 2/1958 | (GB) . |

* cited by examiner

*Primary Examiner*—Bekir L. Yildirim
(74) *Attorney, Agent, or Firm*—Stephen I. Miller

(57) ABSTRACT

The invention concerns a process for hydrogenation, hydroisomerization and/or hydrodesulfurization of a sulfur contaminant containing hydrocarbon feedstock, wherein the feedstock is contacted in the presence of hydrogen gas with a catalyst, which catalyst comprises platinum, palladium or a combination thereof on a non-crystalline, acidic silica-alumina support, which support is obtained by sol-gel techniques and wherein the ratio of Si to Al is from 1:10 to 200:1.

18 Claims, No Drawings

PROCESS FOR HYDROGENATION, HYDROISOMERIZATION AND/OR HYDRODESULFURIZATION OF A SULFUR CONTAINMENT CONTAINING FEEDSTOCK

BACKGOUND

The present invention is directed to a process for hydrogenation, hydroisomerization and/or hydrodesulfurization of a sulfur contaminant containing feedstock, and to a catalyst suitable for such a process.

When hydrogenation catalysts are used in the hydrogenation of petroleum distillates and derivatives thereof, often a problem presents itself in that the feed comprises sulfur and/or sulfur components, which adversely affect the lifetime of the catalyst. In such processes conventional hydrogenation catalysts are usually applied, for instance supported nickel or platinum catalysts. To reduce this problem of deactivation, much attention has been paid to the removal of at least part of the sulfur and sulfur compounds from the gaseous or liquid feed prior, to the hydrogenation.

In general sulfur impurities are present in feeds as mercaptans or thiophenes, more in particular thiophene, dithiophene, benzothiophene, dibenzothiophene, as well as substitution products thereof, which sulfur impurities can be hydrogenated to $H_2S$ using a sulfidized Co—Mo catalyst. This method is also known as hydrodesulfurization (HDS).

The $H_2S$ produced therein is generally present in the gaseous phase. After separation from the liquid product stream the $H_2S$ is usually adsorbed from the gaseous phase and processed into elemental sulfur.

The product stream obtained from the HDS process still contains some sulfur. Typical sulfur levels of these product streams from HDS-units range from 0.1 to 500 ppm.

When nickel is used as a catalyst in the subsequent hydrogenation step, the major part of the sulfur is taken up by the nickel. As a result, the nickel catalyst will be deactivated in the course of time.

Similar problems to those described above may occur in hydroisomerization processes catalyzed by a metal catalyst on a support. In these processes, the carbon chain of a paraffin is converted into a different carbon chain having the same carbon to hydrogen ratio.

While the deterioration of nickel catalysts caused by sulfur poisoning is in practice an irreversible process, noble metal catalysts retain part of their activity in the presence of sulfur contaminants. The sensitivity of noble metals to sulfur is related to the properties of the support and the metal(s) used.

In U.S. Pat. No. 3,943,053 it has been proposed to use a catalyst of an alloy of platinum and palladium in a weight ratio of approximately 1:3 on a chlorinated alumina support for the hydrogenation of aromatics and olefins present in hydrocarbon fractions containing sulfur and nitrogen compounds. This catalyst was reported to decrease the amount of aromatics in an effluent by 66% compared to catalysts of the single metals.

The French patent application 2 569 995 describes the use of a catalyst based on vermiculite having a molar ratio of silica:alumina of at least 12:1 and a high specific surface area. The catalyst further comprises at least one metal or compound thereof chosen from Group VIII of the Periodic Table. The most preferred catalyst described in said French patent application comprises at least one oxide of a metal chosen from Group VIII of the Periodic Table in combination with at least one oxide of a metal chosen from Group VI of the Periodic Table on said vermiculite support.

The European patent application 0 669 162 discloses a catalyst for a process for reducing the aromatic content of a hydrocarbon stream. Said catalyst comprises a specific silica-alumina carrier on which one or more metals of Group VIII of the Periodic Table are deposited.

A comparable catalyst is disclosed in EP-A 582 347.

A disadvantage of this catalyst is that the specific silica-alumina carrier is obtained from a solution of an aluminum alcoholate and/or carboxylate and a silicon alcoholate and/or varboxlyate. The use of these organic starting materials for preparing the carrier is environmentally unattractive. Furthermore, the preparation of the carrier involves the extrusion of a viscous paste, which is an additional process step.

Other catalysts of platinum and palladium are disclosed in U.S. Pat. No. 5,308,914 and international patent application WO-A-94/19429. In the first document the disclosed catalyst is supported on a zeolite Y support and in the latter on a zeolite beta support.

Although the catalysts of platinum and palladium on zeolite supports appear to be more active than those on e.g. alumina, they have some disadvantages. It was found that hydrogenation, hydroisormerization and/or hydrodesulfurization using a catalyst based on platinum, palladium or a comination thereof on a zeolite support tends to become more difficult when the used feedstock is heavier. Furthermore, some of these zeolites are expensive materials, thus rendering the use of catalysts on these zeolite supports economically less attractive.

In view of the above, there is a need for an improved process for hydrogenation, hydroisomerization and/or hydrodesulfurization of sulfur containing feedstocks.

SUMMARY OF THE INVENTION

It is therefore an object of the invention to provide a process for hydrogenation, hydroisomerization and/or hydrodesulfurization of a sulfur contaminant containing feedstock, wherein a catalyst is used which has a low sulfur sensitivity.

Another object of the invention is to provide a process for hydrogenation, hydroisomerization and/or hydrodesulfurization of a sulfur contaminant containing feedstock, wherein a catalyst is used which comprises a support consisting of beads having high mechanic strength, which beads are prepared in an environmentally attractive manner.

It is a further object of the invention to provide a process for hydrogenation, hydroiacmrization and/or hydrodesulfurization of a sulfur contaminant containing feedstock, wherein a catalyst is used which has a high hydrogenation, hydroisomerization and/or hydrodesulfurization activity.

Still another object of the invention is to provide a process for hydrogenation, hydroisomerization and/or hydrodesulfuritation of a sulfur contaminant containing feedstock, wherein both light and heavy feedstocks may be hydrogenated, hydroisomerized and/or hydrodesulfurized.

Yet another object of the invention is to provide a process for hydrogenation, hydroisomerization and/or hydrodesulfurization of a sulfur contaminant containing feedstock, which process combines the above objects in an optimal manner, i.e. wherein a catalyst having a well-balanced, fine-tuned profile of all the above desired qualities and characteristics is used.

The present invention is based on the surprising discovery, that the use of a non-crystalline, acidic silica-alumina support, which support is obtained by sol-gel techniques, greatly improves the above-mentioned characteristics of catalysts based on platinum, palladium or combinations thereof, and having a degree of dispersion of at least 0.3, in a process for hydrogenation, hydroisomerization and/or hydrodesulfuriation.

DETAILED DESCRIPTION OF THE INVENTION

The present invention accordingly is directed to a process for hydrogenation, hydroisomarization and/or hydrodesulfurization of a sulfur contaminant containing hydrocarbon feedstock, wherein the feedstock is contacted in the presence of hydrogen gas with a catalyst having a dispersion degree of at least 0.3, at temperatures in the range of from 50 to 350° C., which catalyst comprises platinum, palladium or a combination thereof on a non-crystalline, acidic silica-alunna support, which support is obtained by sol-gel techniques, comprising the dropwise addition of an aqueous sol of inorganic salts of aluminum and silicon through an oil-phase to an alkaline water phase, and wherein the ratio of Si to Al is from 1:10 to 200:1.

An important and surprising advantage of the process of the invention resides therein that the support of the used catalyst consists of beads which have a much higher mechanical strength than the conventional extrudate supports. At the same time, the activity of the noble metal of a catalyst which is used in a process according to the invention is about equal or higher compared to that of similar catalysts having comparable active noble metal surfaces, as defined by CO adsorption. In other words, according to the invention a higher activity per unit reactor volume is achieved when compared to the process disclosed in EP-A-0 669 162, while the same amount of catalyst is used.

More in particular, it can be remarked that the invention has the advantage that substantially less catalytically active material is required for obtaining the same activity as a prior art catalyst. Also, the catalyst used in the process of the invention works at lower temperatures compared to standard HDS catalysts. This may result in a lower aromatic content of the product stream, due to a more favorable thermodynamic equilibrium. Finally, promoters, such as the chlorine of U.S. Pat. No. 3,943,053, can be dispensed with.

The process according to the invention comprises in its most general form reactions in which hydrocarbon feeds containing sulfur contaminants are reacted in the presence of hydrogen. An important class of these feeds is formedvby the various sulfur containing petroleum distillates and derivatives thereof.

Typical feedstocks to be hydrogenated, hydroisomerized and/or hydrodesulfurizedin the process of the invention usually have a sulfur contaminant content of from 0.1 to 500 ppm, preferably from 0.1 to 300 ppm calculated as sulfur, based on the weight of the feedstock. Examples of such feeds are inter alia benzene, "white oils", gasoline, middle distillates, such as diesel and kerosene, solvents and resins. More in particular the process is to be used for hydrogenating aromatic compounds in these feedstocks, e.g. dearomatizing hydrocarbon feeds that may contain thiophenic sulfur contaminants.

Surprisingly, it has further been found that olefins in an aromatic feedstock may be selectively hydrogenated in a process according to the invention. Particularly when a catalyst comprising only palladium is used, this hydrogenation of olefins in an aromatic feedstock is highly efficient.

In a specific embodiment, the catalyst of the invention is combined with a nickel catalyst in accordance with the procedure described in international patent application WO-A-97/03150. In a process in accordance with this embodiment, a hydrocarbon feed containing sulfur contaminants is contacted with the catalyst of the invention prior to or simultaneously with contacting a nickel catalyst. In this manner, the sulfur resistance of a nickel catalyst is improved and a very long life-time is obtained.

The process according to the inventioncan be carriedout in various types of reactors which are suitable for hydrogenation, such as solid bed reactors, fluid bed reactors, slurry-phase reactors, trickle-phase reactors and the like.

In different embodiments of the process of the invention modifications can be made in reactor configuration and process design, at least partly depending on the nature of the feed and the temperature required for the desired reaction.

The process conditions are the known ones used for the hydrogenation, hydroisomerization and/or hydrodesulfurization of the feeds used.

The hydrogen (partial) pressure used for the hydrogenation, hydroisomerization and/or hydrodesulfurization depends on the type of feed and is preferably of from 0.5 to 300 bar, more preferably of from 0.9 to 250 bar.

Generally suitable conditions for the process according to the invention comprise hydrogen pressures between 0.5 and 300 bar, temperatures between 50 and 350° C. and liquid hourly space velocities (LHSV) between 0.1 and 25 $h^{-1}$. Depending on the type of teedstock the temperature can suitably be chosen within the said ranges Various heavier feeds, especially those containing sulfur compounds having a higher boiling point, such as dithiophene, benzothiophene and dibenzothiophene, require a rather high temperature for the hydrogenation, with the result that the temperature to be used for the process corresponds to the temperature at which the platinum, palladium or combination thereof is most effective.

As has been mentioned above, an important aspect of the invention, leading to the advantageous process for hydrogenation, hydroisomerization and/or hydrodesulfurization of a sulfur contaminant containing hydrocarbon feedstock, is the choice for a very specific catalyst. Thus, the invention also rolates to a catalyst for use in a hydrogenation, hydroisomerization and/or hydrodesulfurization process as described above.

According to the invention the catalyst has a dispersion degree of at least 0.3. The dispersion degree as defined herein is an important aspect of the catalyst of this embodiment. The dispersion degree is defined as the ratio of the number of CO molecules adsorbed in the first pulse, determined as set forth hereinbelow, and the number of metal atoms present in the catalyst sample.

The dispersion degree can be determined by measuring the amount. of CO adsorbed on a sample in reduced form of the catalyst at 25° C. and a pressure of 1 bar as follows. A known amount of a sample of the catalyst is placed in a reactor and reduced with hydrogen at 200° C. After cooling in hydrogen to 25° C., the reactor is flushed with helium for at least 30 minutes. Subsequently, the helium stream is interchanged with six pulses of a known amount of CO and the concentration of CO is measured at the outlet of the reactor with a thermal conductivity detector. The amounts of catalyst and CO are chosen such that the catalyst is saturated with CO after the first pulse, the second through sixth pulse are used to verify this.

The upper limit for the dispersion degree corresponds to the theoretical number of CO atoms that can be bound to one noble metal (Pt or Pd) atom. For practical purposes a value of 1 is generally a suitable upper limit.

The support of the catalyst used according to the invention is non-crystalline. Crystallinity is generally determined by X-ray diffraction. A non-crystalline material as used in the invention (more in particular a non-zeolitic material) has an X-ray diffraction pattern, which does not exhibit any diffraction peaks with a width at half height less than 1.0 degree of arc (measured over the double diffraction angle).

The acidity of the silica-alumina support can for example be measured using $NH_3$ TPD. In this technique, a known amount of a sample of the support is saturated with $NH_3$ gas at 50° C. The reactor is subsequently flushed with helium or another inert gas and the temperature of the reactor is increased, while the concentration of $NH_3$ at the outlet of the reactor is measured with a thermal conductivity detector. Ammonia heats of adsorption may be aobtained using the method as described by R. J. Cvetanovic et al., in Catalysis Reviews (H. Heinemann and J. J. Carberry, Eds.), 6 (1972), 21 and J. A. Kovalinka et al., in J. Catal. 48 (1977), 365, which give a measure for the acidity of the material.

A support is considered to be acidic when it adsorbs $NH_3$ with a heat of adsorption of at least 39 kJ/mol. Especially adsorption sites with a heat of adsorption (as determined according to the above method) of about 40 kJ/mol are important.

However, according to a preferred embodiment the non-crystalline, acidic silica-alumina support has two acidic sites; one with an ammonia heat of adsorption of about 40 kJ/mol and one with an ammonia heat of adsorption of between 43 and 48 kJ/mol, preferably about 46 kJ/mol. In particular, the acidic site with an ammonia heat of adsorption of between 43 and 48 kJ/mol is an important aspect for the preferred embodiments of the invention. The non-crystalline, acidic support to be used in the catalyst preferably has a ratio of the adsorption sites with between 43 and 48 kJ/mol to the ones with about 40 kJ/mol of between 3:1 and 1:10. This ratio will be referred to herein as the acidic ratio.

In this regard it is to be noted that applying platinum, palladium or a combination thereof to the support does not have a large influence on the acidity, especially not at noble metal loadings below 2 wt. %.

The non-crystalline, acidic silica-alumina support of the catalyst is obtained by sol-gel techniques, which are highly attractive from an environmental point of view. These techniques are described in for instance EP-A-0 090 994 and comprise the dropwise addition of an aqueous sol of inorganic salts of aluminum and silicon through an oil-phase to an alkaline water phase. This way, homogeneous beads are obtained which have a uniform porosity.

An advantage of preparing the support in this specific manner is that beads are obtained without performing a separate shape forming step such as extrusion. Moreover, beads can be handled very conveniently and safely during loading and unloading of a reaction vessel and enable a very high degree of packing in a reaction vessel due to their nearly spherical shape.

Another advantage of preparing the support by this sol-gel preparation method is that the obtained support has a very high mechanic strength and gives rise to hardly any production of fines, if it all. Both the Bulk Crush Strength (BCS) and the Side Crush Strength (SCS) of the support have very high values.

Bulk Crush Strength is measured according to the principle of applying pressure to a number of particles in a cylinder and subsequently measuring the amount of fines produced. A detailed description of the equipment and method can be found in the Shell Method Series (SMS) 1471–81.

Side Crush Strength is defined as the pressure needed to crush a single particle of a specified size. The. unit wherein the SCS is expressed may vary dependent on the nature of the particle. For extrudates the value is generally reported as N/mn, for spheres as N or $N/cm^2$. Measurement of the SCS is usually carried out for at least 25 particles to account for the spread in strength among the particles.

In the British patent 790,476 a catalyst comprising platinum and/or palladium on a silica-alumina support, has been disclosed, which support may be obtained by a sol-gel technique. This catalyst is, however, a catalyst for a process of reforming hydrocarbon fractions. Also, the preparation of the silica-alumina support described in this document comprises the preparation of a silica support by a sol-gel technique, wherein the alumina is introduced later by an ion-exchange method or a subsequent impregnation step. The described preparation leads to a support having a smaller surface area than that of the support of the catalyst which is used in accordance with the present invention.

The silica-alumina support of the catalyst to be used in the present invention may have a surface area chosen in the range of from 25 to 900 $m^2/g$, preferably in the range of from 25 to 700 $m^2/g$. More preferably, the surface area of the support ranges from 200 to 700 $m^2/g$, most preferably from 200 to 500 $m^2/g$. It was found that a support having a surface area falling within the specified ranges renders a catalyst the most active.

The pore size distribution of the support of a catalyst used in a process according to the invention is preferably higher than 3.0 nm, more preferably higher than 3.5 nm. It has been found, that applying the metal component to the support does not significantly alter the pore size distribution.

According to the invention, the Si/Al atomic ratio is of from 1:10 to 200:1, preferably of from 1:10 to 100:1. It is most preferred to have a Si/Al atomic ratio of from 1:3 to 50:1. Within this range an optimal increase in activity is observed.

Preferably, the catalyst comprises at least 0.01, more preferably 0.01 to 5, and most preferably 0.1 to 2, weight percent of the noble metal, i.e. platinum, palladium or a combination thereof, based on the weight of the catalyst.

The catalyst preferably comprises both platinum and palladium. In this preferred embodiment, the platinum and palladium used in the catalyst of the invention are preferably present in an atomic ratio of from 10:1 to 1:10, more preferably of 5:1 to 1:5. It is remarked, that it is uncertain in which chemical form the metal is active. This may be the pure metal, but it is also possible that the metal sulfide is at least partly responsible for the increase in the sulfur resistance.

The catalyst which is used in accordance withthe invention can be prepared by applying the noble metal component on the support having the required characteristics. Examples of such preparations and the conditions thereof are known to the skilled person. The application of the active metal component and/or components or precursors thereof to the support material can be performed by means of impregnation, adsorption, ion-exchange, chemical vapor deposition (CVD) or precipitation, if necessary, followed by further treatment to convert the precursor to the actual catalyst.

The invention also encompasses the use of a non-crystalline, acidic support for improving the performance of a catalyst based on platinum, palladium or a combination thereof in hydrogenation, hydroisomerization and/or hydrodesulfurization reactions of a sulfur contaminant containing feedstock.

The invention is further elucidated on the basis of the following, non restrictive, examples.

EXAMPLES

In order to obtain the data listed in the examples, the following methods were employed.

Dispersion of the catalysts was measured by pulse CO chemisorption after in situ reduction of the catalyst at 200° C. for 15 minutes.

The acidity of the supports was measured by $NH_3$ TPD.

Products of the hydrogenation and hydroisomerization reactions were analyzed using GC equipment with a FID for hydrocarbons and a Sievers chemiluminescence sulfur detector.

Comparative Example I

A commercially available silica-alumina support (Grace, J-540) was calcined at 600° C. for 2 hours prior to incipient wetness impregnation containing the appropriate amount of $Na_2PdCl_4$ and $H_2PtCl_6$ in order to obtain a catalyst comprising desired amounts of platinum and palladium.

After drying at 105° C. for at least 1 hour, the catalyst was reduced in a mixture of 15% $H_2$ and 85% $N_2$ at 300° C. The flow was set to 5 l/h.g. Reduction was terminated by switching to a 100% $H_2$ stream (1 l/h.g) at 400° C. and maintaining this temperature for another hour followed by cooling to less than 100° C. while the hydrogen flow was continued. After flushing the reactor with nitrogen, air was admitted without any further precautions. No heat evolvement was observed.

Data of the two prepared catalysts are listed below.

| MVC017: | |
|---|---|
| form of support: | powder |
| $Al_2O_3$ content of support: | 13 wt. % |
| $SiO_2$ content of support: | 87 wt. % |
| surface area: | 335 m$^2$/g |
| acidic ratio: | 0.71 |
| amount of palladium: | 2.70 wt. % |
| amount of platinum: | 0.90 wt. % |
| CO adsorbed: | 1.720 Nml/g |
| dispersion degree | 0.26 |

Comparative Example II *A mixture comprising* 30 wt. % of alumina (Versal-250) and 70 wt. % of silica-alumina (Grace J-540) was prepared. To this mixture, water and nitric acid were added until gelation started. Gelation was terminated by addition of ammonia. The obtained product was extruded and calcined at a temperature over 500° C.

The thus prepared support was impregnated with a solution containing the appropriate amount of $Na_2PdCl_4$ and $H_2PtCl$. in order to obtain a catalyst comprising desired amounts of platinum and palladium.

After drying, the catalyst was reduced analogous to the procedure described in Comparative Example I. The following data of the prepared catalyst were obtained.

| MVC025: | |
|---|---|
| form of support: | extrudate |
| $Al_2O_3$ content of support: | 40 wt. % |
| $SiO_2$ content of support: | 60 wt. % |
| amount of palladium: | 0.90 wt. % |
| amount of platinum: | 0.30 wt. % |
| CO adsorbed: | 0.838 Nml/g |
| dispersion degree | 0.37 |

Comparative Example III

A commercially available platinum catalyst on an alumina support (Engelhard, E-302) was crushed and sieved to 75–150 μm. The following data of the catalyst were obtained.

| E-302: | |
|---|---|
| form of support: | extrudate |
| $Al_2O_3$ content of support: | 100 wt. % |
| $SiO_2$ content of support: | 0 wt. % |
| surface area: | 172 m$^2$/g |
| acidic ratio: | 0.84 |
| amount of palladium: | 0 wt. % |
| amount of platinum: | 0.55 wt. % |
| CO adsorbed: | 0.356 Nml/g |
| dispersion degree | 0.56 |
| Cl content | 0.18 wt. % |

Example I

A support for a catalyst was prepared by mixing water glass and an aluminum sulphate solution. The obtained solution started to gelate and was added dropwise to oil. After sinking through the oil, the droplets were entered into a water phase that transported them to a separator. Subsequently, the obtained beads were dried and calcined.

A catalyst was prepared by incipient wetness impregnation of the obtained silica-alumina beads, with an aqueous solution of chloroplatinic acid and sodium palladium chloride, followed by drying at 105° C. for 16 hours and reduction in a stream of hydrogen at 400° C. for 1 hour.

Below, data are listed of the supports used, the platinum and palladium content of the catalyst, as well as the results of a CO adsorption experiment.

| MVC030: | |
|---|---|
| $Al_2O_3$ content of support: | 10 wt. % |
| $SiO_2$ content of support: | 90 wt. % |
| surface area: | 435 m$^2$/g |
| acidic ratio: | 0.79 |
| amount of palladium: | 0.90 wt. % |
| amount of platinum: | 0.30 wt. % |
| CO adsorbed: | 1.030 Nml/g |
| dispersion degree | 0.46 |
| MVC044-1: | |
| $Al_2O_3$ content of support: | 10.8 wt. % |
| $SiO_2$ content of support: | 89.2 wt. % |
| surface area: | 370 m$^2$/g |
| acidic ratio: | 0.79 |
| amount of palladium: | 0.90 wt. % |
| amount of platinum: | 0.30 wt. % |

-continued

| | |
|---|---|
| CO adsorbed: | 1.00 Nml/g |
| dispersion degree | 0.45 |
| MVC041-12: | |
| Al$_2$O$_3$ content of support: | 10.8 wt. % |
| SiO$_2$ content of support: | 89.2 wt. % |
| surface area: | 370 m$^2$/g |
| acidic ratio: | 0.79 |
| amount of palladium: | 0 wt. % |
| amount of platinum: | 0.67 wt. % |
| CO adsorbed: | 0.645 Nml/g |
| dispersion degree | 0.82 |
| MVC047: | |
| Al$_2$O$_3$ content of support: | 3.44 wt. % |
| SiO$_2$ content of support: | 96.56 wt. % |
| surface area: | 460 m$^2$/g |
| acidic ratio: | 0.38 |
| amount of palladium: | 0.90 wt. % |
| amount of platinum: | 0.30 wt. % |
| CO adsorbed: | 0.843 Nml/g |
| dispersion degree | 0.38 |
| MVC048: | |
| Al$_2$O$_3$ content of support: | 3.1 wt. % |
| SiO$_2$ content of support: | 96.9 wt. % |
| surface area: | 618 m$^2$/g |
| acidic ratio: | 0.32 |
| amount of palladium: | 0.90 wt. % |
| amount of platinum: | 0.30 wt. % |
| CO adsorbed: | 1.108 Nml/g |
| dispersion degree | 0.49 |

Comparative Example IV

A hydrogenation reaction was carried out using the catalyst MVC025 as prepared in Comparative Example II. The feedstock used had a sulfur content of 3 ppm and contained about 90 wt. % paraffins, 8 wt. % aromatics having a boiling point higher than 130° C., and 2 wt. % olefins having a boiling point higher than 130° C.

Hydrogenation was effected in a fixed bed reactor loaded with 30 ml catalyst at a temperature of between 150 and 275° C. and a pressure of about 30 bar. The feedstock was flowed through the catalyst bed (LHSV=5 h$^{-1}$ and GHSV=1000 h$_{-1}$) and the effluent was analyzed.

The performance of the catalyst was as follows: hydrodesulfurization: 96% at 150° C. hydrodearomatization: 56% at 200° C.

Example II

A hydrogenation reaction was carried out using the catalyst MVC030, as described in Example I. The feedstock and reaction conditions were the same as described in Comparative Example II.

The performance of the catalyst was as follows:

hydrodesulfurization: 99% at 10° C.

hydrodearomatization: 94% at 200° C.

Example III

A hydrogenation reaction was carried out using the catalyst MVC044-1, as described in Example I. The feedstock, comprising 20 wt. % aromatics, had a sulfur content of 8 ppm and a boiling range of 180–300° C. The reaction conditions were chosen as described in Comparative Example II.

The performance of the catalyst was as follows:
hydrodesulfurization: 93% at 150° C.
hydrodearomatization: 78% at 200° C.

Example IV

Hydrogenation reactions were carried out using a feedstock containing 9.5 wt. % tetralin mixed with paraffins and 35 ppm sulfur. The catalysts used are listed in Table I, and are described in Comparative Examples I and II, and in Example I. The catalysts were crushed and sieved to 75–150 μm before the reaction in order to facilitate a comparison with conventional catalysts having a powder form.

Hydrogenation was carried out at a pressure of 30 bar, a LHSV of 35 h$^{-1}$ and a GHSV of 8000 h$^{-1}$. The results are listed in Table I.

TABLE I

| Catalyst | T$_{80\% \text{ HDS}}$* (° C.) | X$_{\text{tetralin at 225° C.}}$** (%) |
|---|---|---|
| MVC017*** | 228 | 12 |
| E-302*** | 257 | 0 |
| MVC044-1 | 195 | 46 |
| MVC041-12 | 215 | 14 |
| MVC047 | 193 | 77 |
| MVC048 | 185 | 99 |

*Temperature at which hydrodesulfurization had occurred to an extent of 80%.
**Conversion of tetralin at 225° C.
***Comparative Example.

What is claimed is:

1. A process for hydrogenation, hydroisomerization and/or hydrodesulfurization of a sulfur contaminant containing hydrocarbon feedstock, wherein the feedstock is contacted in the presence of hydrogen gas with a catalyst having a dispersion degree of at least 0.3, at temperatures in the range of from 50 to 350° C., which catalyst comprises platinum, palladium or a combination thereof on a non-crystalline, acidic silica alumina support, which support has been obtained by a sol-gel technique comprising the dropwise addition of an aqueous sol of inorganic salts of aluminum and silicon through an oil-phase to an alkaline water phase, and wherein the ratio of Si to Al is from 1:20 to 200:1.

2. The process of claim 1, wherein the catalyst has an acidi ratio of between 3:1 and 1:10.

3. The process of claim 1, wherein the catalyst comprises platinum, palladium or a combination thereof in an amount of from 0.01 to 5 weight percent, based on the weight of the catalyst.

4. The process of claim 1, wherein the catalyst. comprises platinum and palladium.

5. The process of claim 2, wherein the catalyst comprises platinum and palladium in an atomic ratio of 10:1 to 1:10.

6. The process of claim 1, wherein a feedstock having a sulfur contaminant content of from 0.1 to 500 ppm calculated as sulfur, based on the weight of the feedstock, is hydrogenated and/or hydrodesulfurized.

7. The process of claim 1, wherein the hydrocarbon feedstock contains thiophenic sulfur contaminants.

8. The process of claim 1, wherein the sulfur contaminant containing hydrocarbon feedstock is selected from the group consisting of white oils, solvents, diesels or middle distillates, gasoline, resins and kerosine.

9. The process of claim 1, wherein the feedstock is a product from an upstream hydrodesulfurization unit.

10. The process of claim 1, wherein the feedstock is contacted with the catalyst under a hydrogen pressure of from 0.5 to 300 bar.

11. A catalyst for hydrogenation, hydroisomerization and/or hydrodesulfurization of a sulfur contaminant containing feedstock, which catalyst is based on platinum, palladium or combination thereof on a non-crystalline, acidic silica-alumina support, which support has been obtained by a sol-gel technique and has a surface area of from 25 to 700 m$^2$/g, wherein the catalyst has a dispersion degree of at least 0.3 and wherein the ratio of Si to Al is from 1:10 to 200:1.

12. The process of claim 1, wherein the catalyst comprises platinum, palladium or a combination thereof in an amount of from 0.1 to 2 weight percent, based on the weight of the catalyst.

13. A process for hydrogenation, hydroisomerization and/or hydrodesulfurization of a sulfur contaminant containing hydrocarbon feedstock, wherein the feedstock is contacted in the presence of hydrogen gas with a catalyst having a dispersion degree of at least 0.3, at temperatures in the range of from 50 to 350° C., which catalyst comprises platinum, palladium or a combination thereof on a non-crystalline, acidic silica alumina support having two acidic sites, which support is obtained by a sol-gel technique comprising the dropwise addition of an aqueous sol of inorganic salts of aluminum and silicon through an oil-phase to an alkaline water phase, and wherein the ratio of Si and Al is from 1:20 to 200:1.

14. The process of claim 13, wherein a first acidic site of the non-crystalline support has an ammonia heat of adsorption of between 43 and 48 kJ/mol.

15. The process of claim 14, wherein a second acidic site of the non-crystalline support has an ammonia heat of adsorption of about 40 kJ/mol, and the ratio of the first acidic site to the second acidic site is between 3:1 and 1:10.

16. The catalyst of claim 11, wherein the sol-gel technique comprised the dropwise addition of an aqueous sol of inorganic salts of aluminum and silicon through an oil-phase to an alkaline water phase.

17. The process of claim 1, wherein the support has a surface area of from 25 to 700 m$^2$/g.

18. The process of claim 1, wherein the support has a surface area of from 200 to 500 m$^2$/g.

* * * * *